US008701201B2

(12) United States Patent
Rouhana, Jr.

(10) Patent No.: US 8,701,201 B2
(45) Date of Patent: Apr. 15, 2014

(54) METHOD AND APPARATUS FOR PRIVACY PROTECTION

(76) Inventor: William J. Rouhana, Jr., Greenwich, CT (US)

( * ) Notice: Subject to any disclaimer, the term of this patent is extended or adjusted under 35 U.S.C. 154(b) by 919 days.

(21) Appl. No.: 12/217,345

(22) Filed: Jul. 3, 2008

(65) Prior Publication Data
US 2009/0013377 A1    Jan. 8, 2009

Related U.S. Application Data

(60) Provisional application No. 60/958,381, filed on Jul. 5, 2007.

(51) Int. Cl.
*H04L 29/00* (2006.01)
(52) U.S. Cl.
USPC ............... 726/26; 709/206; 726/13; 726/23; 726/25
(58) Field of Classification Search
USPC ............................... 709/206; 726/13, 23, 25
See application file for complete search history.

(56) References Cited

U.S. PATENT DOCUMENTS

| 7,730,532 | B1 * | 6/2010 | Yeo ................................. 726/22 |
| 7,756,933 | B2 * | 7/2010 | Reshef et al. ................ 709/206 |
| 2002/0111910 | A1 * | 8/2002 | Walsh ............................ 705/51 |
| 2002/0194222 | A1 | 12/2002 | Kaply et al. |
| 2004/0210560 | A1 | 10/2004 | Shuster |
| 2005/0015429 | A1 * | 1/2005 | Ashley et al. ................ 709/200 |
| 2006/0074896 | A1 | 4/2006 | Thomas et al. |
| 2006/0075122 | A1 | 4/2006 | Lindskog et al. |
| 2007/0094243 | A1 | 4/2007 | Kwak et al. |
| 2007/0130005 | A1 | 6/2007 | Jaschke |

FOREIGN PATENT DOCUMENTS

WO    WO 2004006130    1/2004

* cited by examiner

*Primary Examiner* — Brandon Hoffman
*Assistant Examiner* — Michael D Anderson
(74) *Attorney, Agent, or Firm* — Epstein Drangel LLP; Robert L. Epstein

(57) ABSTRACT

The privacy of users of the Internet and interactive television is protected by actuating a 'privacy button" on the computer of the end user to cause the computer to search the user's computer to identify all cookies designed to track the user's computer behavior; disable each of the cookies identified by the search; identify the source of each of the disabled cookies; create, carry and forward a message to the identified cookie source that the end user does not want to have his computer behavior observed and/or to receive any advertising until further notice; create, carry and forward a message to the end user's Internet service provider that the end user does not want to receive any advertising and/or that computer observation activity is to be suspended by the Internet service provider until further notice; search the computer memory to identify all websites visited by the end user on the computer during a given time period; and create, carry and forward a message to each website identified in the search that the end user does not want to have his computer behavior observed and/or to receive any advertising until further notice.

20 Claims, 4 Drawing Sheets

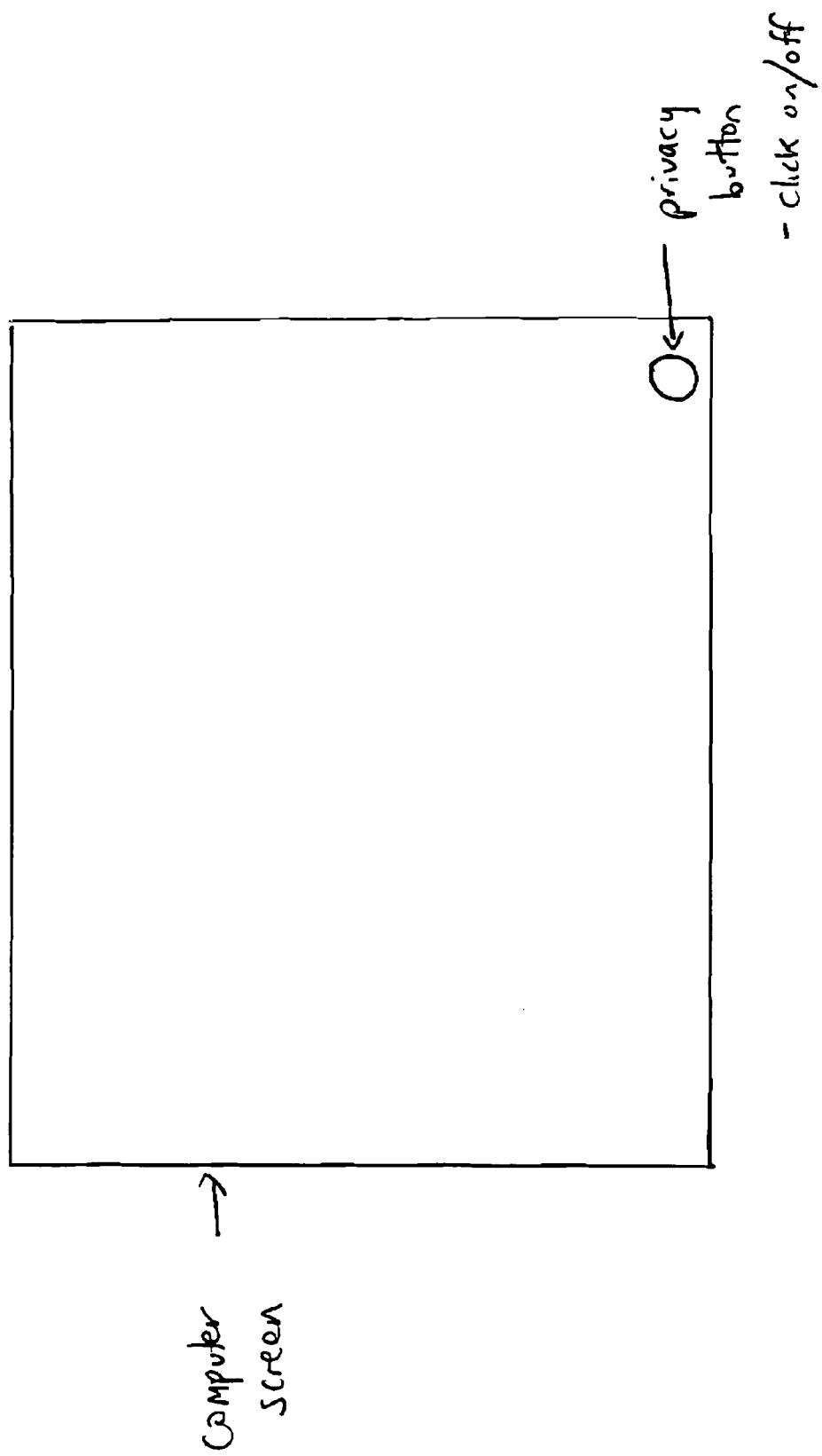

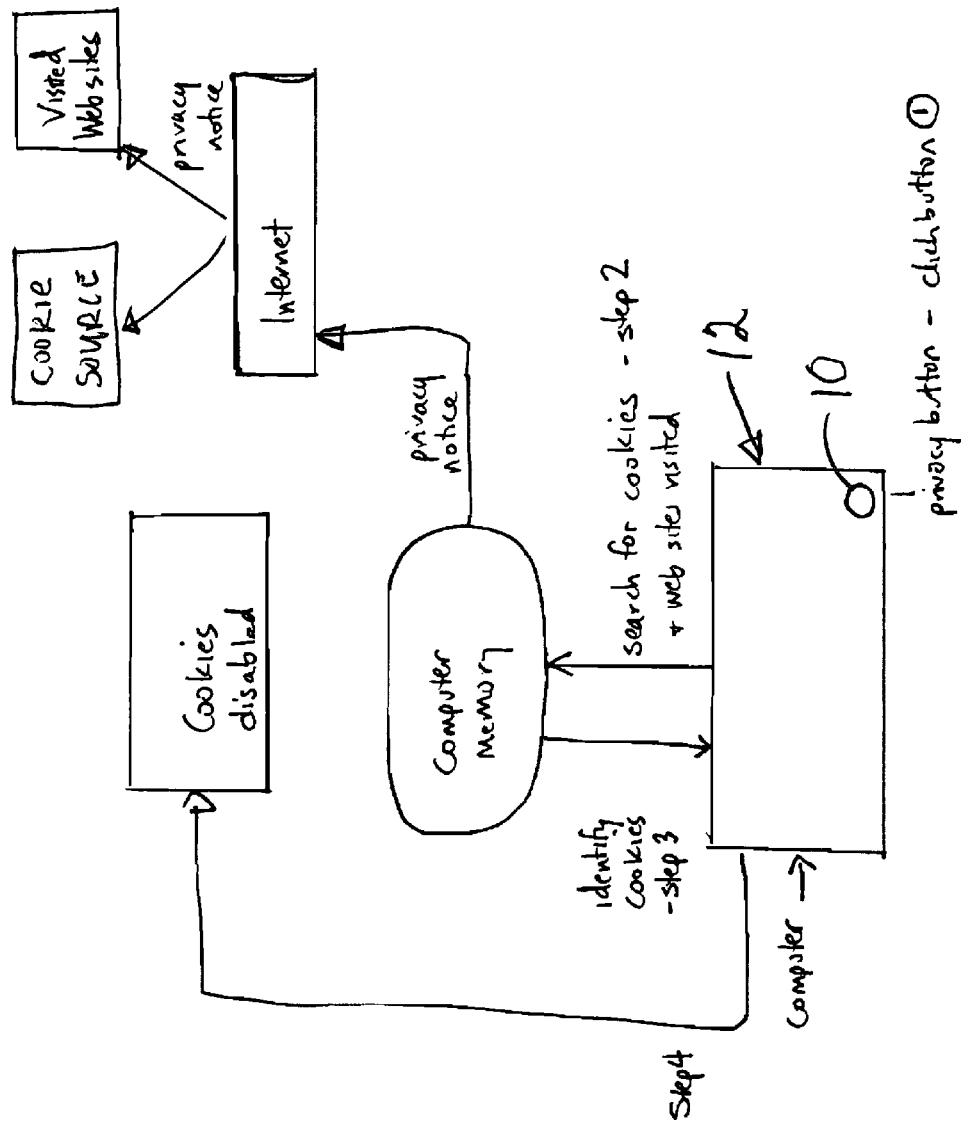

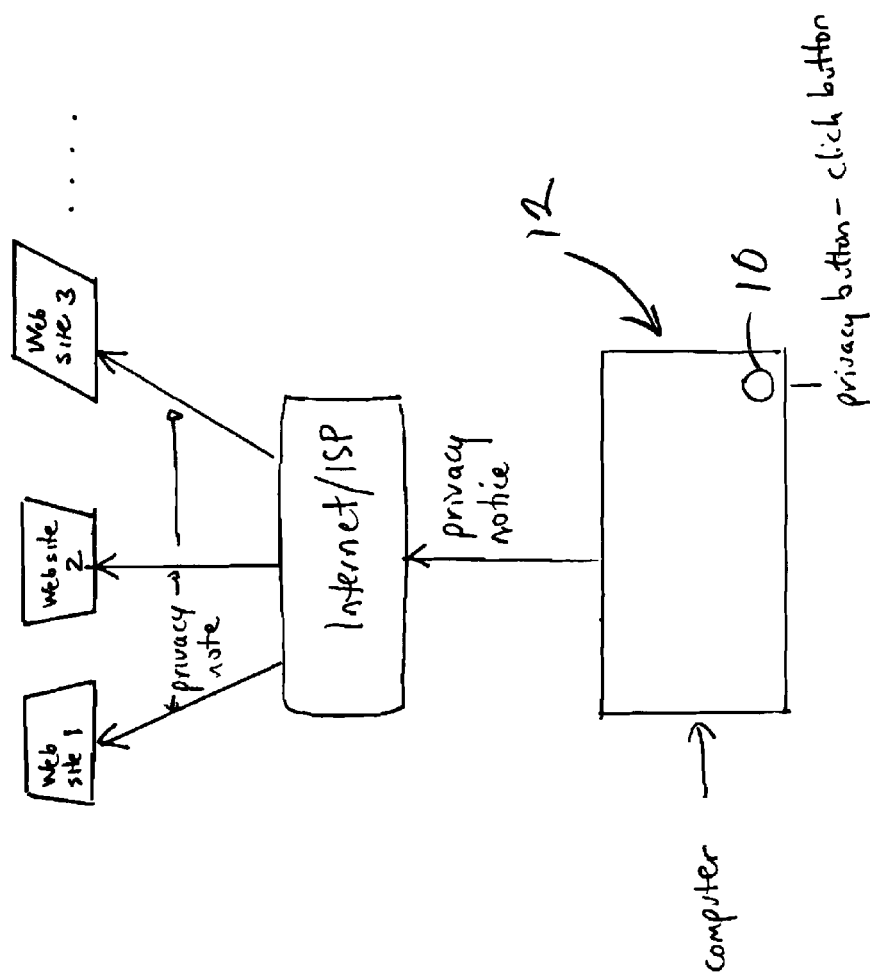

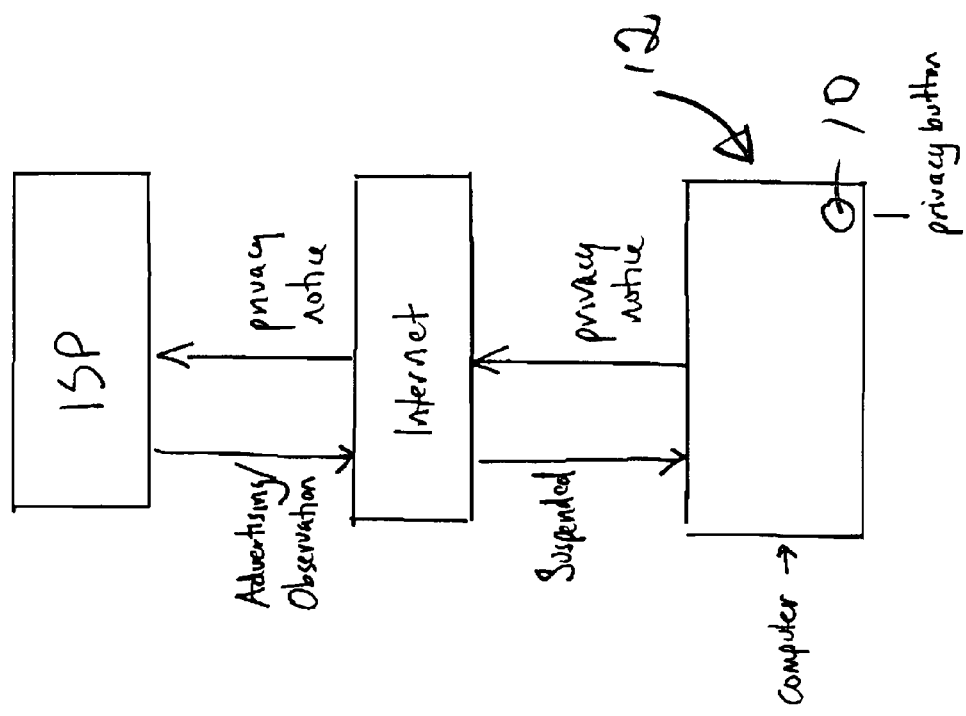

METHOD AND APPARATUS FOR PRIVACY PROTECTION

CROSS-REFERENCE TO RELATED APPLICATIONS

Priority is claimed on provisional patent application Ser. No. 60/958,381 filed Jul. 5, 2007.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to Internet advertising and interactive television advertising and more particularly to a method and apparatus for the protection of the privacy of end users of the Internet and interactive television.

2. Description of Prior Art Including Information Disclosed Under 37 CFR 1.97 and 1.98

Targeted advertising on the Internet and interactive television is growing rapidly. It is considered by many to be the holy grail of the advertising business because of the ability to target advertising towards a specific customer for whom the advertising is relevant at the moment that the advertising is presented.

The effectiveness of such advertising depends in large part up the accuracy of the information that the advertiser is able to gather about intended recipients In order to determine which recipients are the appropriate targets for specific advertisements, advertisers, publishers and internet service providers (ISPs) work separately and together to obtain as much information about intended recipients as is possible. They use a variety of methods to obtain this information, including placing cookies on the intended recipients' computer desktops, observing the data stream of the intended recipients at the ISP and observing and recording the behavior patterns of intended recipients at publishers' web sites.

Recipients benefit greatly from targeted advertising by receiving advertisements that are particularly relevant and significant to their interests and needs in a timely fashion, rather than large amounts of information which at any given time may not be of interest or importance to them. Nevertheless, the increasingly pervasive observation of the computer behavior of intended recipients is considered to be offensive to many individuals and causes a great deal of concern about invasion of privacy issues among legislators and others who influence public policy.

BRIEF SUMMARY OF THE INVENTION

The purpose of the present invention is to provide a simple and easy means for computer users to protect their privacy by informing their internet service providers, publishers and advertisers when they want or are amenable to receiving targeted advertising, thereby making it possible for internet advertisers, publishers and ISPs to make maximum use of targeting technology without violating the privacy of individuals.

The above objectives are achieved by the present invention which, in one aspect thereof relates to a computer implemented method of protecting the privacy of users of the Internet and interactive television. The method includes the steps of:

(a) searching the user's computer to identify all cookies designed to track the user's computer behavior;

(b) disabling each of the cookies identified by the search;

(c) identifying the source of each of the disabled cookies;

(d) creating and forwarding a message to the identified cookie source that the end user does not want to have his computer behavior observed and/or to receive any advertising until further notice;

(e) creating and forwarding a message to the end user's Internet service provider that the end user does not want to receive any advertising and/or that computer observation activity is to be suspended by the Internet service provider until further notice;

(f) searching the computer memory to identify all websites visited or to be visited by the end user on the computer during a given time period; and (g) creating and forwarding a message to each website identified in the search that the end user does not want to have his computer behavior observed and/or to receive any advertising until further notice.

The end user's computer is provided with a privacy button. The method further includes the step of causing the computer to perform steps (a) through (g) in response to the actuation of the privacy button.

The method further includes the steps of:

(h) creating and forwarding a message to the identified cookie source that the end user is open to have his computer behavior observed and/or to receive any advertising;

(i) creating and forwarding a message to the end user's Internet service provider that the end user is open to receive any advertising and/or that computer observation activity is permitted by the Internet service provider; and (j) creating and forwarding a message to each website identified in the search and visited by the end user that the end user is open to have his computer behavior observed and/or to receive any advertising.

The method also includes the step of causing the computer to perform steps (h) through (j) in response to further actuation of the privacy button.

In accordance with another object of the present invention, a system is provided for protecting the privacy of users of the Internet and interactive television. The system includes:

(a) means for searching the user's computer to identify all cookies designed to track the user's computer behavior;

(b) means for disabling each of the cookies identified by the searching means;

(c) means for identifying the source of each of the disabled cookies;

(d) means for creating, carrying and forwarding a message to the identified cookie source that the end user does not want to have his computer behavior observed and/or to receive any advertising until further notice;

(e) means for creating, carrying and forwarding a message to the end user's Internet service provider that the end user does not want to receive any advertising and/or that computer observation activity is to be suspended by the Internet service provider until further notice;

(f) means for searching the computer memory to identify all websites visited by the end user on the computer during a given time period; and (g) means for creating and forwarding a message to each website identified in the search that the end user does not want to have his computer behavior observed and/or to receive any advertising until further notice.

The system further includes a privacy button on the end user's computer. The privacy button causes the means (a) through (g) to be actuated in response to the actuation of the privacy button.

The system further includes:

(h) means for creating, carrying and forwarding a message to the identified cookie source that the end user is open to have his computer behavior observed and/or to receive any advertising;

(i) means for creating, carrying and forwarding a message to the end user's Internet service provider that the end user is open to receive any advertising and/or that computer observation activity is permitted by the Internet service provider; and (j) means for creating, carrying and forwarding a message to each website identified in the search that the end user is open to have his computer behavior observed and/or to receive any advertising.

The computer is caused to actuate (h) through (j) in response to further actuation of the privacy button.

BRIEF DESCRIPTION OF THE SEVERAL VIEWS OF DRAWINGS

To these and to such other objects that may hereinafter appears, the present invention relates to a method and apparatus for privacy protection as described in detail in the following specification and recited in the annexed claims, taken together with the accompanying drawings, in which like numerals refer to like parts and in which:

FIG. 1 is a pictorial representation of the computer screen of the end user showing the privacy button thereon;

FIG. 2 is a flow chart of the search of the individual's computer to identify each of the cookies present in the computer designed to record the computer behavior of the end user, the process for disabling each of the identified cookies until the privacy button is deactivated and the search of the memory of the computer to identify all websites visited during a given period and the creation and forwarding of a message to each;

FIG. 3 illustrates in greater detail the process by which a notice is created and forwarded to each identified cookie source; and FIG. 4 illustrates the process by which the ISP is notified that the end user does or does not wish to receive any advertising and/or that any observation activity is to be suspended by the ISP.

DETAILED DESCRIPTION OF THE INVENTION

As illustrated in FIG. 1, the present invention relates to a computer implemented method of protecting the privacy of users of the Internet and interactive television. A privacy button 10 or other input means that can be toggled between an "on" and an "off" state is provided on the computer screen 12 of the end user or on some other convenient part of the computer. When privacy button 10 is actuated by the end user to the "on" state, a program is actuated to search the user's computer memory to identify all cookies designed to track the user's computer behavior and all websites visited by the computer and to disable each of the cookies identified by the search. The source of each of the disabled cookies is then identified. A "privacy notice" message is then created and sent, via the Internet, through the internet service provider to the source of the identified cookies and to the visited websites that the end user does not want to have his computer behavior observed and/or to receive any advertising until further notice.

As illustrated in greater detail in FIG. 3, the privacy notice message created by the computer is forwarded to the various identified websites through the Internet in sequence in any order programmed into the computer, such as chronologically according to the time the website was accessed, the frequency of access or the like, all of which is routinely stored in the Internet history.

As illustrated in FIG. 4, a 'privacy notice" message is also created and forwarded to the end user's Internet service provider. The message tells the ISP that the end user does or does not want to receive any advertising and/or that computer observation activity is to be suspended by the Internet service provider until further notice.

When the end user wants to turn off the privacy notice, the privacy button is actuated again to change to the "off" state. That causes the computer to create and forward a message to the identified cookie source that the end user is now open to have his computer behavior observed and/or to receive any advertising. The computer also creates and forwards a message to the end user's Internet service provider that the end user is open to receive any advertising and/or that computer observation activity is permitted by the Internet service provider. Further, the computer creates and forwards a message to each website identified in the search that the end user is now open to have his computer behavior observed and/or to receive any advertising. In addition, the appropriate message (on or off) is carried with the end user as he or she visits various web sites.

Accordingly the system of the present invention is designed to protect the privacy of users of the Internet and interactive television. The system includes means for searching the user's computer to identify all cookies designed to track the user's computer behavior. Means are provided for disabling each of the cookies identified by the searching means. Means are provided for identifying the source of each of the disabled cookies. Means are provided for creating, carrying and forwarding a message to the identified cookie source that the end user does not want to have his computer behavior observed and/or to receive any advertising until further notice. Means are provided for creating, carrying and forwarding a message to the end user's Internet service provider that the end user does not want to receive any advertising and/or that computer observation activity is to be suspended by the Internet service provider until further notice. Means are provided for searching the computer memory to identify all websites visited by the end user on the computer during a given time period. Means are also provided for creating, carrying and forwarding a message to each website identified in the search that the end user does or does not want to have his computer behavior observed and/or to receive any advertising until further notice.

The system further includes a privacy button 10, preferably located on the end user's computer screen 12. The privacy button causes the above mentioned means to be actuated in response to the actuation of the privacy button.

The system also includes means for creating and forwarding a message to the identified cookie source that the end user is open to have his computer behavior observed and/or to receive any advertising. Means are provided for creating, carrying and forwarding a message to the end user's Internet service provider that the end user is open to receive any advertising and/or that computer observation activity is permitted by the Internet service provider. In addition, means for creating, carrying and forwarding a message to each website identified in the search that the end user is open to have his computer behavior observed and/or to receive any advertising.

The computer is caused to actuate the above means in response to further actuation of the privacy button.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims.

I claim:

1. A computer readable medium containing instructions for an Internet-connected computer of the user to perform a method of protecting the privacy of user, the computer of the user having a memory within which is stored cookies and information relating to websites visited, the method comprising the steps of:
    (a) manually initiating a search of the memory of the user's computer to identify all cookies stored in the computer memory designed to track the user's computer behavior;
    (b) the user's computer automatically disabling all of the cookies in the user's computer memory identified by the search;
    (c) the user's computer using each of the disabled cookies in the user's computer's memory to identify the source of each of the disabled cookies;
    (d) the user's computer automatically creating and forwarding a message to the source of each disabled cookie in the user's computer memory that the user does not want to have the user's computer behavior observed and/or to receive any advertising until further notice;
    (e) the user's computer automatically creating and forwarding a message to the user's Internet service provider that the user does not want to receive any advertising and/or that computer observation activity is to be suspended by the Internet service provider until further notice;
    (f) the user' computer automatically searching the memory of the user's computer to identify websites visited by the user on the computer during a given time period; and
    (g) the user's computer automatically creating and forwarding a message to websites identified in the search that the user does not want to have user's computer behavior observed and/or to receive any advertising until further notice.

2. The method of claim 1 wherein the user's computer is provided with a manually actuatable privacy button, and further comprising the step of the user's computer performing steps (a) through (g) in response to the actuation of the privacy button.

3. The method of claim 1 further comprising the steps of:
    (h) the user's computer automatically creating and forwarding a message to the source of each disabled cookie in user's computer memory that the user is open to have his computer behavior observed and/or to receive any advertising;
    (i) the user's computer automatically creating and forwarding a message to the user's Internet service provider that the user is open to receive any advertising and/or that computer observation activity is permitted by the Internet service provider; and
    (j) the user's computer automatically creating and forwarding a message to websites identified in the search that the user is open to have user's computer behavior observed and/or to receive any advertising.

4. The method of claim 3 further comprising the step of the user's computer automatically performing steps (h) through (j) in response to further manual actuation of the privacy button.

5. A system for protecting the privacy of users of the Internet and interactive television, the system including an Internet-connected computer of the user having a memory storing cookies and information about websites visited by the user, comprising:
    (a) means located within the user's computer for searching the memory of the user's computer to identify cookies designed to track the user's computer behavior;
    (b) means located within the user's computer for automatically disabling all the cookies in the computer memory identified by the searching means;
    (c) means located within the user's computer for automatically identifying the source of each of the disabled cookies in the user's computer memory;
    (d) means located within the user's computer for automatically creating and forwarding a message to the source of each disabled cookie in user's computer memory that the user does not want to have user's computer behavior observed and/or to receive any advertising until further notice;
    (e) means located within the user's computer for automatically creating and forwarding a message to the user's Internet service provider that the user does not want to receive any advertising and/or that computer observation activity is to be suspended by the Internet service provider until further notice;
    (f) means located within the user's computer for automatically searching the computer memory to identify websites visited by the user on the computer during a given time period; and
    (g) means located within the user's computer for automatically creating and forwarding a message to websites identified in the search that the user does not want to have his computer behavior observed and/or to receive any advertising until further notice.

6. The system of claim 5 further comprising a privacy button on the user's computer, said privacy button causing the means (a) through (g) to be actuated in response to the manual actuation of the privacy button.

7. The system of claim 6 further comprising:
    (h) means located within the user's computer for automatically creating and forwarding a message to the source of each disabled cookie in user's computer memory source that the user is open to have his computer behavior observed and/or to receive any advertising;
    (i) means located within the user's computer for automatically creating and forwarding a message to the user's Internet service provider that the user is open to receive any advertising and/or that computer observation activity is permitted by the Internet service provider; and
    (j) means located within the user's computer for automatically creating and forwarding a message to websites identified in the search that the user is open to have his computer behavior observed and/or to receive any advertising.

8. The system of claim 7 wherein the user's computer is caused to actuate the means (h) through (j) in response to further manual actuation of the privacy button.

9. A computer readable medium containing instructions for an Internet-connected computer of the user to perform a method of protecting the privacy of users of the Internet and interactive television, the computer of the user having a memory for storing cookies, the method comprising the steps of:

(a) the user's computer searching the memory of the user's computer to identify cookies stored in the computer memory designed to track the user's computer behavior;

(b) the user's computer disabling all of the cookies in user's computer memory identified by the search;

(c) the user's computer automatically identifying the source of each of the disabled cookies in the user's memory, and (d) the user's computer automatically creating and forwarding a message to the source of each disabled cookie in user's computer memory that the user does not want to have his computer behavior observed and/or to receive any advertising until further notice.

10. The method of claim 9 further comprising the step of:

(e) the user's computer automatically creating and forwarding a message to the user's Internet service provider that the user does not want to receive any advertising and/or that computer observation activity is to be suspended by the Internet service provider until further notice.

11. The method of claim 9 further comprising the steps of:

(f) the user's computer automatically searching the memory of the user's computer to identify websites visited by the user on the computer during a given time period; and (g) the user's computer automatically creating and forwarding a message to websites identified in the search that the user does not want to have his computer behavior observed and/or to receive any advertising until further notice.

12. The method of claim 9 further comprising the step of:

(h) the user's computer automatically creating and forwarding a message to the source of each disabled cookie in user's computer memory that the user is open to have his computer behavior observed and/or to receive any advertising.

13. The method of claim 9 further comprising the step of:

(i) the user's computer automatically creating and forwarding a message to the user's Internet service provider that the user is open to receive any advertising and/or that computer observation activity is permitted by the Internet service provider.

14. The method of claim 9 further comprising the step of:

(j) the user's computer to automatically creating and forwarding a message to websites identified in the search that the user is open to have his computer behavior observed and/or to receive any advertising.

15. A system for protecting the privacy of users of the Internet and interactive television, the system having an Internet-connected computer of the user having a memory for storing cookies and information relating to the websites visited by the user, the system comprising: means located within the user's computer for searching the memory of the user's computer to identify cookies stored in the user's computer memory designed to track the user's computer behavior; means located within the user's computer for disabling all of the cookies in the user's computer memory identified by the search; means located within the user's computer identifying the source of each of the disabled cookies in the user's computer memory; and means located within the user's computer for creating and forwarding a message to the source of each disabled cookie in user's computer memory that the user does not want to have his computer behavior observed and/or to receive any advertising until further notice.

16. The system of claim 15 further comprising means located within the user's computer for creating and forwarding a message to the user's Internet service provider that the user does not want to receive any advertising and/or that computer observation activity is to be suspended by the Internet service provider until further notice.

17. The system of claim 15 further comprising means located within the user's computer for searching the memory of the user's computer to identify websites visited by the user on the computer during a given time period; and means located within the user's computer for creating and forwarding a message to websites identified in the search that the user does not want to have his computer behavior observed and/or to receive any advertising until further notice.

18. The system of claim 15 further comprising means located within the user's computer for creating and forwarding a message to the source of each disabled cookie in the user's computer memory that the user is open to have user's computer behavior observed and/or to receive any advertising.

19. The system of claim 15 further comprising means located within the user's computer for creating and forwarding a message to the user's Internet service provider that the user is open to receive any advertising and/or that computer observation activity is permitted by the Internet service provider.

20. The system of claim 15 further comprising means located within the user's computer for creating and forwarding a message to websites identified in the search that the user is open to have his computer behavior observed and/or to receive any advertising.

* * * * *